United States Patent
Le et al.

(10) Patent No.: US 8,031,434 B2
(45) Date of Patent: Oct. 4, 2011

(54) HYBRID, SELF ALIGNED MAGNETIC WRITE HEAD WITH A PARTIALLY PLATED POLE AND METHOD OF PRODUCING SAME

(75) Inventors: Quang Le, San Jose, CA (US); Jeffrey S. Lille, Sunnyvale, CA (US); Aron Pentek, San Jose, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 948 days.

(21) Appl. No.: 11/966,113

(22) Filed: Dec. 28, 2007

(65) Prior Publication Data
US 2009/0168258 A1    Jul. 2, 2009

(51) Int. Cl.
*G11B 5/147* (2006.01)

(52) U.S. Cl. ................ 360/125.1; 360/125.08

(58) Field of Classification Search ............ 360/125.08, 360/125.1, 125.12, 125.13, 125.15, 125.07
See application file for complete search history.

(56) References Cited

U.S. PATENT DOCUMENTS

| | | | |
|---|---|---|---|
| 6,687,084 B2 | 2/2004 | Takahashi et al. | 360/126 |
| 6,687,085 B2 | 2/2004 | Minor et al. | 360/126 |
| 6,697,221 B2 | 2/2004 | Sato et al. | 360/126 |
| 6,728,064 B2 | 4/2004 | Sato et al. | 360/126 |
| 6,738,222 B2 | 5/2004 | Sato et al. | 360/126 |
| 6,952,867 B2 | 10/2005 | Sato | 29/603.15 |
| 7,054,106 B2 | 5/2006 | Kudo et al. | 360/126 |
| 7,054,107 B2 | 5/2006 | Saitho et al. | 360/126 |
| 7,133,255 B2 | 11/2006 | Lille et al. | 360/126 |
| 7,646,564 B2 * | 1/2010 | Maruyama et al. | 360/125.07 |
| 7,881,010 B2 * | 2/2011 | Guthrie et al. | 360/122 |
| 2005/0105215 A1 * | 5/2005 | Matono | 360/126 |
| 2005/0259357 A1 | 11/2005 | Kameda | 360/126 |
| 2005/0280939 A1 | 12/2005 | Sasaki et al. | 360/126 |
| 2006/0168798 A1 | 8/2006 | Naka | 29/603.16 |
| 2006/0276039 A1 | 12/2006 | Li et al. | 438/689 |
| 2007/0014048 A1 | 1/2007 | Sasaki et al. | 360/126 |

FOREIGN PATENT DOCUMENTS

JP    2003030804    1/2003

* cited by examiner

*Primary Examiner* — Julie Anne Watko
(74) *Attorney, Agent, or Firm* — Zilka-Kotab, PC

(57) ABSTRACT

A magnetic write head for perpendicular magnetic recording. The write head has a secondary flare point defined by magnetic structures that extend from the sides of the write pole, but not over the trailing edge of the write pole. The magnetic structures each have a front edge that defines the secondary flare point. By constructing the magnetic structures so that they only extend from the sides of the write pole and not over the write pole, they can be formed by electroplating, while leafing the mask structure (used to define the write pole) still intact, thereby greatly simplifying manufacture and preventing damage to the write pole during manufacture.

11 Claims, 16 Drawing Sheets

HYBRID, SELF ALIGNED MAGNETIC WRITE HEAD WITH A PARTIALLY PLATED POLE AND METHOD OF PRODUCING SAME

FIELD OF THE INVENTION

The present invention relates to perpendicular magnetic recording and more particularly to a write head having an easily manufactured write pole with a plated secondary flare structure.

BACKGROUND OF THE INVENTION

The heart of a computer's long term memory is an assembly that is referred to as a magnetic disk drive. The magnetic disk drive includes a rotating magnetic disk, write and read heads that are suspended by a suspension arm adjacent to a surface of the rotating magnetic disk and an actuator that swings the suspension arm to place the read and write heads over selected circular tracks on the rotating disk. The read and write heads are directly located on a slider that has an air bearing surface (ABS). The suspension arm biases the slider toward the surface of the disk, and when the disk rotates, air adjacent to the disk moves along with the surface of the disk. The slider flies over the surface of the disk on a cushion of this moving air. When the slider rides on the air bearing, the write and read heads are employed for writing magnetic transitions to and reading magnetic transitions from the rotating disk. The read and write heads are connected to processing circuitry that operates according to a computer program to implement the writing and reading functions.

The write head has traditionally included a coil layer embedded in first, second and third insulation layers (insulation stack), the insulation stack being sandwiched between first and second pole piece layers. A gap is formed between the first and second pole piece layers by a gap layer at an air bearing surface (ABS) of the write head and the pole piece layers are connected at a back gap. Current conducted to the coil layer induces a magnetic flux in the pole pieces which causes a magnetic field to fringe out at a write gap at the ABS for the purpose of writing the aforementioned magnetic transitions in tracks on the moving media, such as in circular tracks on the aforementioned rotating disk.

In recent read head designs a spin valve sensor has been employed for sensing magnetic fields from the rotating magnetic disk. The sensor includes a nonmagnetic conductive layer, referred to as a spacer layer, sandwiched between first and second ferromagnetic layers, referred to as a pinned layer and a free layer. First and second leads are connected to the sensor for conducting a sense current therethrough. The magnetization of the pinned layer is pinned perpendicular to the air bearing surface (ABS) and the magnetic moment of the free layer is located parallel to the ABS, but is free to rotate its magnetic polarization in response to external magnetic fields. The magnetization of the pinned layer is typically pinned by exchange coupling with an antiferromagnetic layer.

When the magnetizations of the pinned and free layers are parallel with respect to one another, resistance is minimal and when the magnetizations of the pinned and free layer are antiparallel, resistance is maximized. Changes in resistance alter the resistance of the spin valve sensor in proportion to $\cos \Theta$, where $\Theta$ is the angle between the magnetizations of the pinned and free layers. In a read mode the resistance of the sensor changes proportionally to the magnitudes of the magnetic fields from the rotating disk. When a sense current is conducted through the sensor, resistance changes cause potential changes that are detected and processed as playback signals.

In order to meet the ever increasing demand for improved data rate and data capacity, researchers have recently been focusing their efforts on the development of perpendicular recording systems. A traditional longitudinal recording system stores data as magnetic bits oriented longitudinally along a track in the plane of the surface of the magnetic disk. This longitudinal data bit is recorded by a fringing field that forms between the pair of magnetic poles separated by a write gap.

A perpendicular recording system, by contrast, records data as magnetizations oriented perpendicular to the plane of the magnetic disk. The magnetic disk has a magnetically soft underlayer covered by a thin magnetically hard top layer. The perpendicular write head has a write pole with a very small cross section and a return pole having a much larger cross section. A strong, highly concentrated magnetic field emits from the write pole in a direction perpendicular to the magnetic disk surface, magnetizing the magnetically hard top layer. The resulting magnetic flux then travels through the soft underlayer in the media, returning to the return pole where it is sufficiently spread out and weak that it will not erase the signal recorded by the write pole when it passes back through the magnetically hard top layer on its way back to the return pole.

SUMMARY OF THE INVENTION

The present invention provides a magnetic write head for perpendicular magnetic recording. The write head has a secondary flare point defined by electroplated magnetic structures that extend from the sides of the write pole. The magnetic structures each have a front edge that defines the secondary flare point.

By constructing the magnetic structures so that they only extend from the sides of the write pole, they can advantageously be formed by electroplating, while leaving the mask structure (used to define the write pole) still intact, This greatly simplifies manufacture and also reduces damage to the write pole during manufacture.

These and other features and advantages of the invention will be apparent upon reading of the following detailed description of preferred embodiments taken in conjunction with the Figures in which like reference numerals indicate like elements throughout.

BRIEF DESCRIPTION OF THE DRAWINGS

For a fuller understanding of the nature and advantages of this invention, as well as the preferred mode of use, reference should be made to the following detailed description read in conjunction with the accompanying drawings which are not to scale.

DETAILED DESCRIPTION OF THE EMBODIMENTS

The following description is of the best embodiments presently contemplated for carrying out this invention. This description is made for the purpose of illustrating the general principles of this invention and is not meant to limit the inventive concepts claimed herein.

Figure 1:
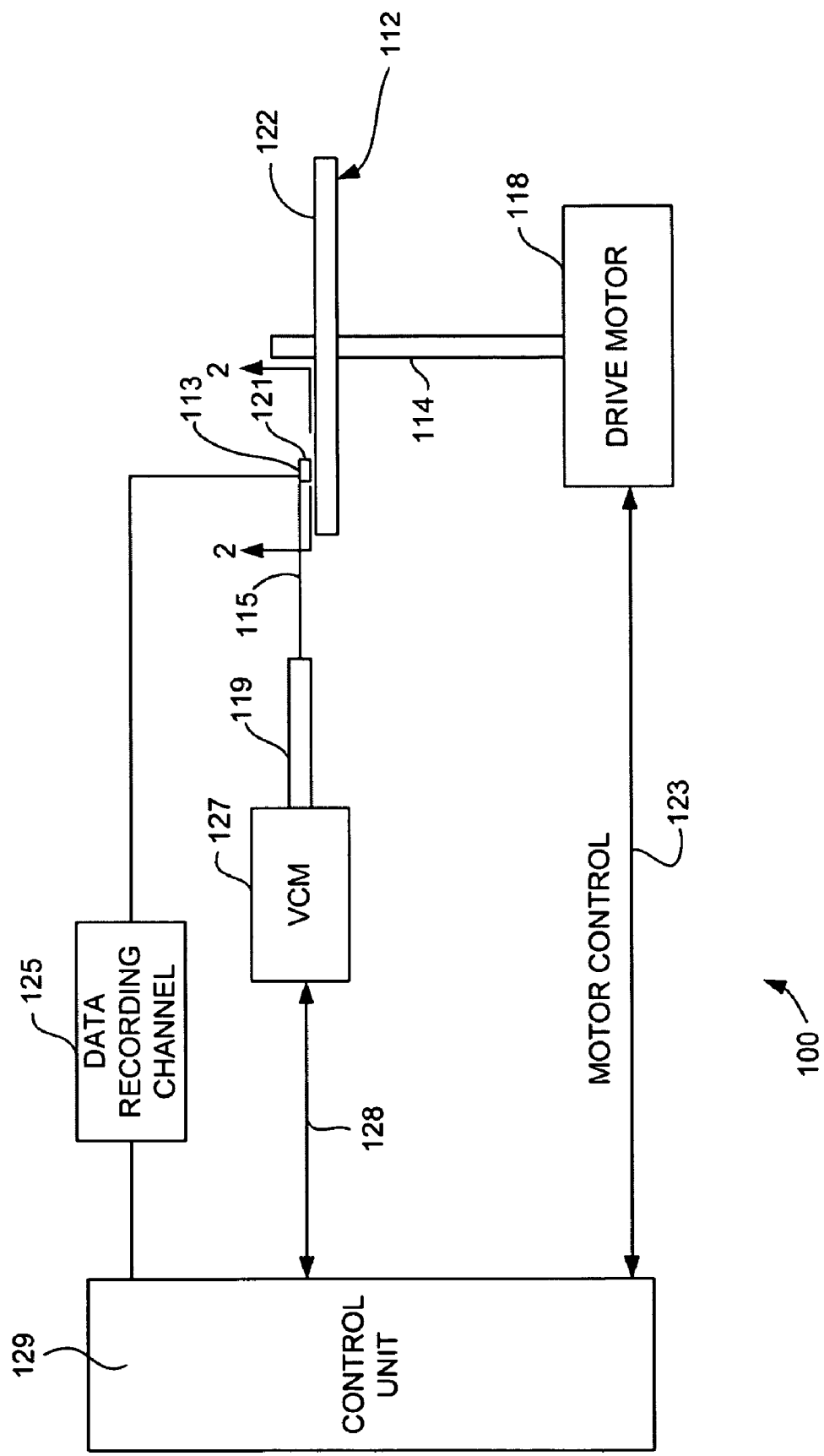
FIG. 1 is a schematic illustration of a disk drive system in which the invention might be embodied.

Referring now to FIG. 1, there is shown a disk drive 100 embodying this invention. As shown in FIG. 1, at least one rotatable magnetic disk 112 is supported on a spindle 114 and rotated by a disk drive motor 118. The magnetic recording on each disk is in the form of annular patterns of concentric data tracks (not shown) on the magnetic disk 112.

At least one slider 113 is positioned near the magnetic disk 112, each slider 113 supporting one or more magnetic head assemblies 121. As the magnetic disk rotates, slider 113 moves radially in and out over the disk surface 122 so that the magnetic head assembly 121 may access different tracks of the magnetic disk where desired data are written. Each slider 113 is attached to an actuator arm 119 by way of a suspension 115. The suspension 115 provides a slight spring force which biases slider 113 against the disk surface 122. Each actuator arm 119 is attached to an actuator means 127. The actuator means 127 as shown in FIG. 1 may be a voice coil motor (VCM). The VCM comprises a coil movable within a fixed magnetic field, the direction and speed of the coil movements being controlled by the motor current signals supplied by controller 129.

During operation of the disk storage system, the rotation of the magnetic disk 112 generates an air bearing between the slider 113 and the disk surface 122 which exerts an upward force or lift on the slider. The air bearing thus counter-balances the slight spring force of suspension 115 and supports slider 113 off and slightly above the disk surface by a small, substantially constant spacing during normal operation.

The various components of the disk storage system are controlled in operation by control signals generated by control unit 129, such as access control signals and internal clock signals. Typically, the control unit 129 comprises logic control circuits, storage means and a microprocessor. The control unit 129 generates control signals to control various system operations such as drive motor control signals on line 123 and head position and seek control signals on line 128. The control signals on line 128 provide the desired current profiles to optimally move and position slider 113 to the desired data track on disk 112. Write and read signals are communicated to and from write and read heads 121 by way of recording channel 125.

Figure 2:
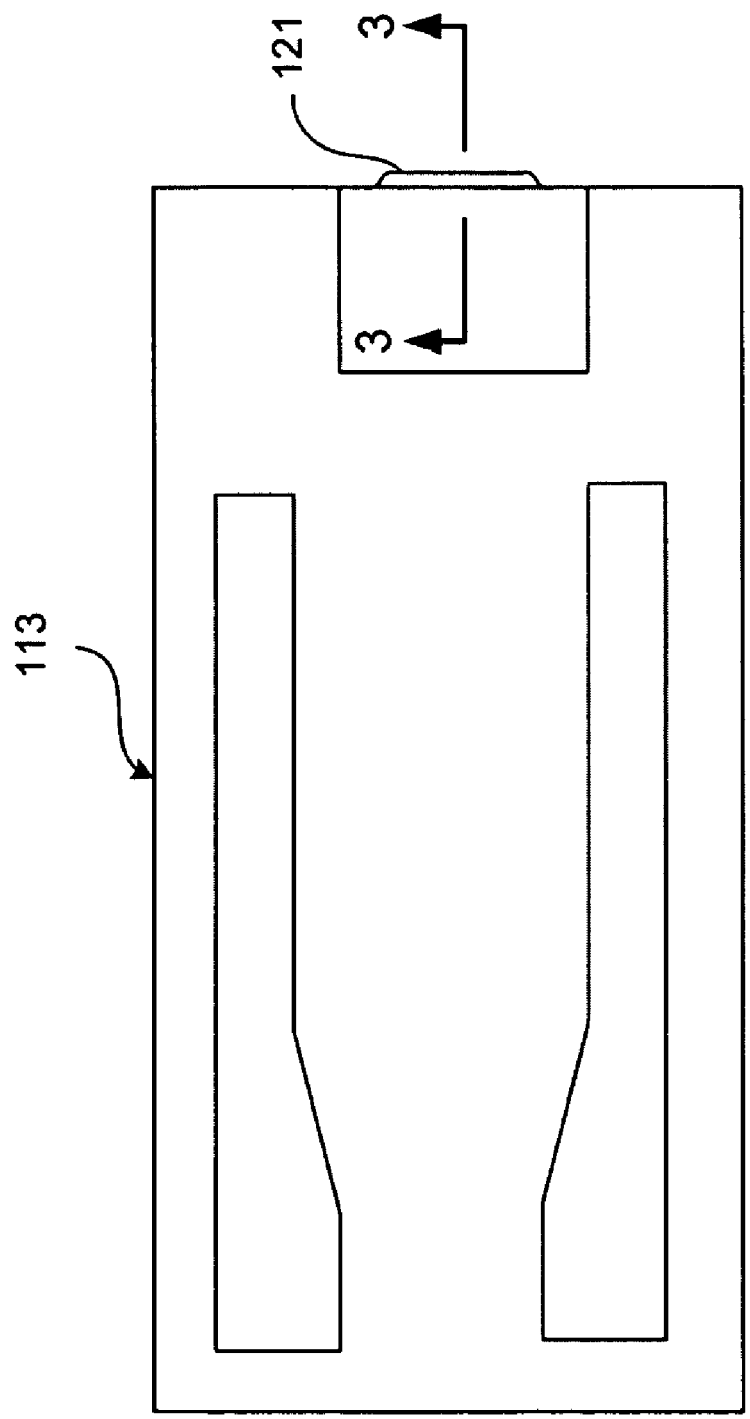
FIG. 2 is an ABS view of a slider, taken from line 2-2 of FIG. 1, illustrating the location of a magnetic head thereon.

With reference to FIG. 2, the orientation of the magnetic head 121 in a slider 113 can be seen in more detail. FIG. 2 is an ABS view of the slider 113, and as can be seen the magnetic head including an inductive write head and a read sensor, is located at a trailing edge of the slider. The above description of a typical magnetic disk storage system, and the accompanying illustration of FIG. 1 are for representation purposes only. It should be apparent that disk storage systems may contain a large number of disks and actuators, and each actuator may support a number of sliders.

Figure 3:
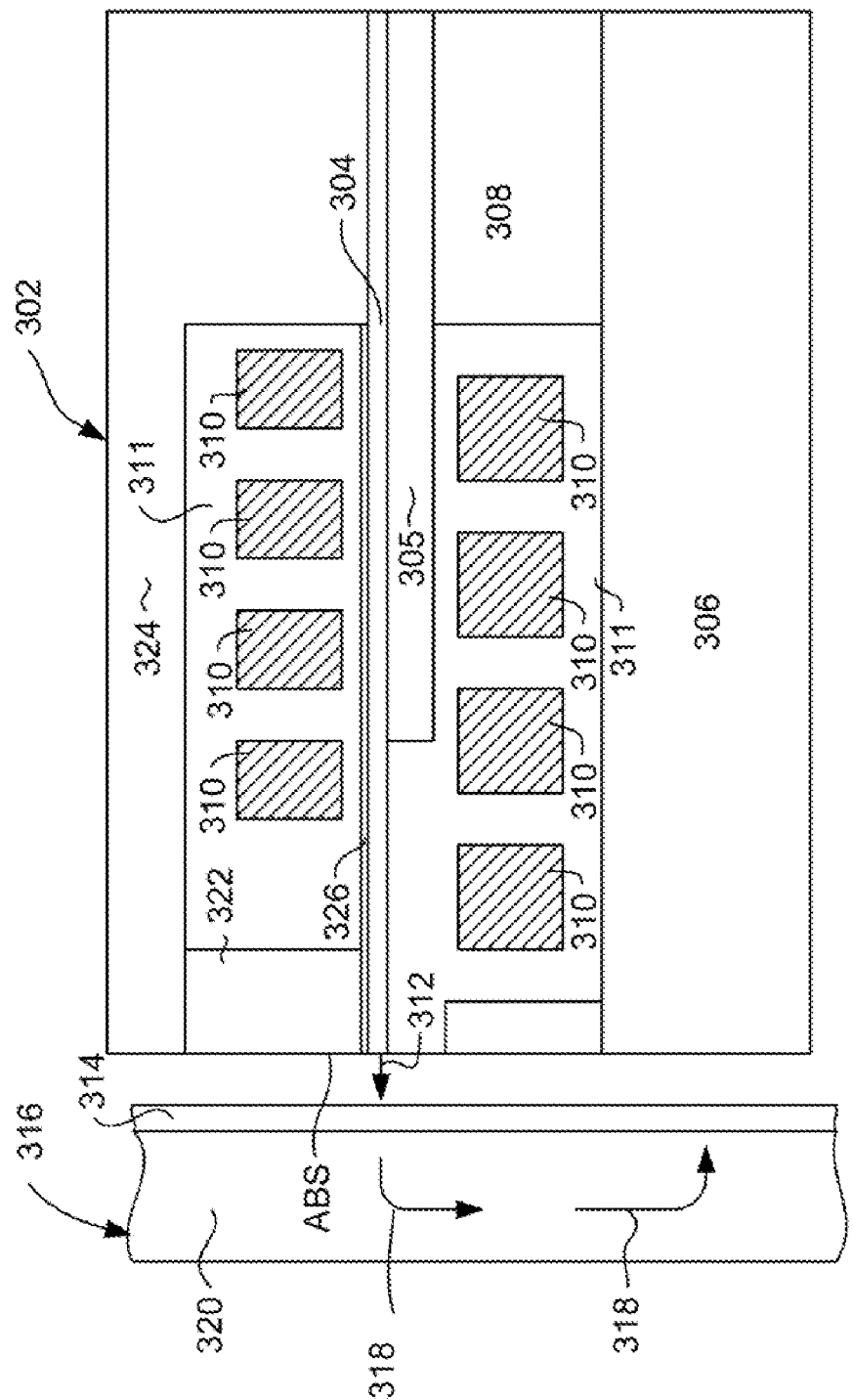
FIG. 3 is a cross sectional view of a magnetic head, taken from line 3-3 of FIG. 2 and rotated 90 degrees counterclockwise, of a magnetic write head according to an embodiment of the present invention.

With reference now to FIG. 3, the invention can be embodied in a magnetic write head 302. The write head includes a write pole 304 and a first, or leading, return pole 306. The return pole has a cross section at the air bearing surface (ABS) that is much larger than that of the write pole. The write pole 304 can be formed upon a magnetic shaping layer 305. The return pole 306 can be magnetically connected with the write pole 304 and shaping layer 305 by a magnetic back gap 308 located away from the ABS. An electrically conductive, non-magnetic write coil 310, shown in cross section in FIG. 3 passes through the write head 302, and can be embedded in a non-magnetic, electrically insulating coil insulation layer 311. When current flows through the write coil 310, a magnetic field is produced, which induces a magnetic flux through the write pole 304. This magnetic flux causes a highly concentrated write field 312 to be emitted from the write pole 312, which locally magnetizes a magnetically hard top layer 314 of a magnetic medium 316. A resulting magnetic flux 318 flows through a magnetically softer under-layer of the magnetic medium 316 to return to the return pole 306 where it is sufficiently spread out that it does not magnetize the top layer 314.

A magnetic trailing shield 322 can be provided at the ABS and is separated from the trailing edge of the write pole 304 by a non-magnetic trailing gap layer 326. The trailing shield 322 can be magnetically connected with the back gap layer 308 by a second, or trailing, magnetic pole 324.

An upper or trailing return pole 324 is stitched to the trailing shield 322 and magnetically connects the trailing shield 322 with the write pole 304 shaping layer 305 and back gap 308 at a region removed from the air bearing surface (ABS).

Figure 4:
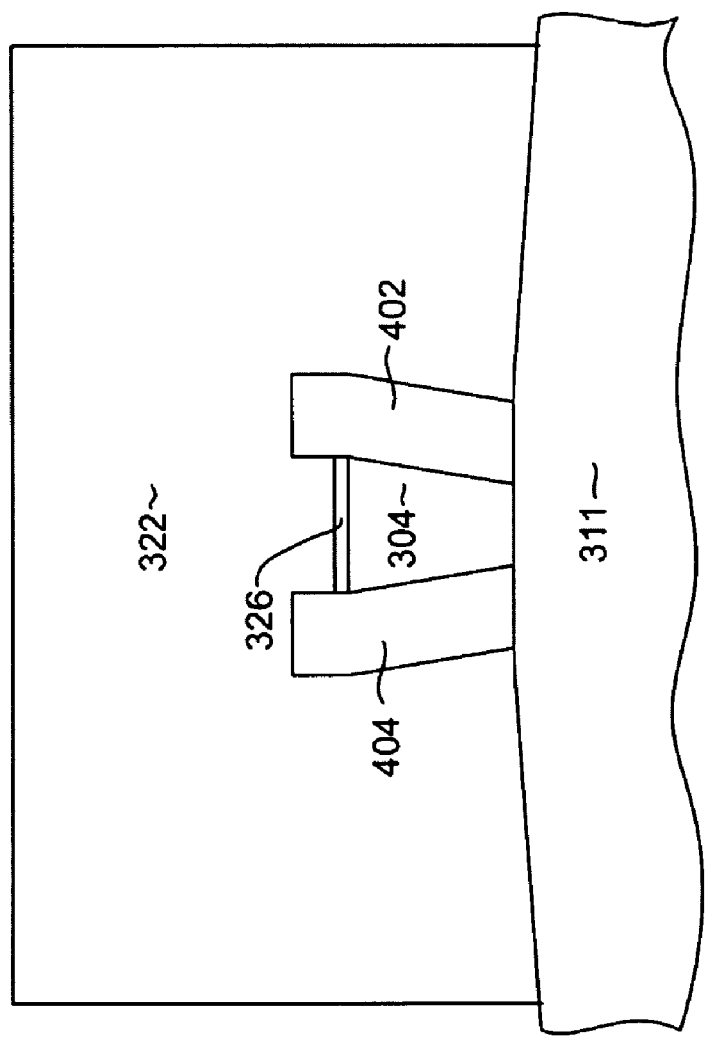
FIG. 4 is an air bearing surface view of a portion of the write head shown of FIG. 3.

The presence of the trailing magnetic shield 322 adjacent to the trailing edge of the write pole 304 increases write speed by increasing the field gradient of the write field 312. With reference now to FIG. 4, a view of the write pole 304 can be seen as viewed from the air bearing surface (ABS). As can be seen, the write pole 304 has a trapezoidal shape with tapered sides. The magnetic shield 322 wraps around the write pole 304 and is separated from the sides of the write pole by non-magnetic side gap layers 402, 404.

Figure 5:
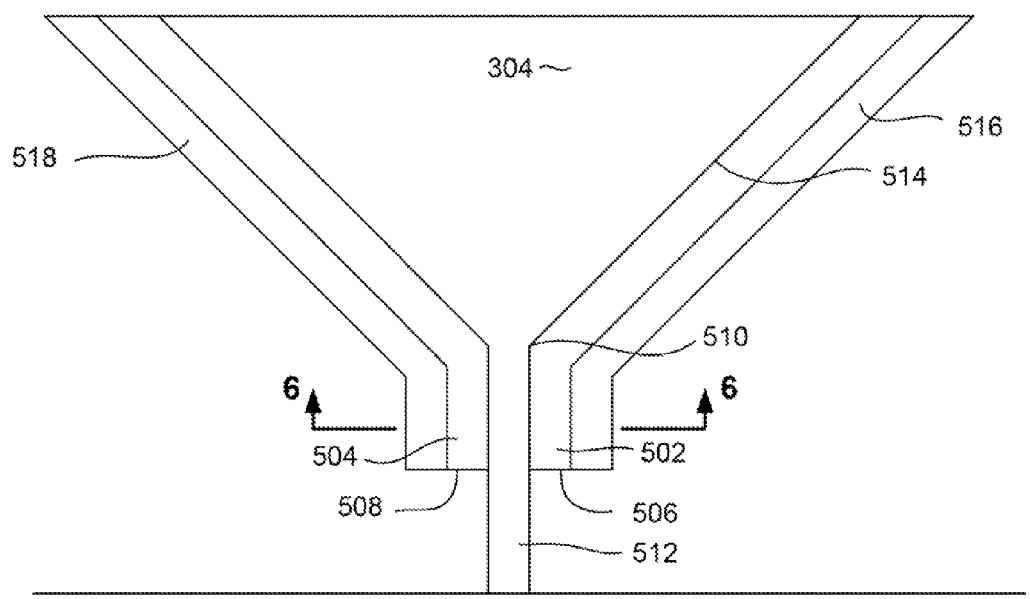
FIG. 5 is a stop down view of a write pole and plated secondary flare point.

FIG. 5 shows a top down view of the write pole 304. Plated, stitched magnetic structures 502, 504 extend from the sides of the write pole 304. These magnetic structures 502, 504 each have a front edge 506, 508, the front edges 506, 508 being self aligned with one another. As can be seen, the write pole 304 has a flare point 510, which is the point at which the write pole 304 transitions from a pole tip portion 512 having a substantially cross section, to a flared potion 514. Traditionally, the location of this flare point 510, relative to the air bearing surface (ABS) has been a critical dimension. If the flare point 510 was too close to the ABS, then flux would leak from the flared region to the ABS, resulting in adjacent track interference. If the flare point 510 was too far from the ABS, then, the pole tip would become magnetically saturated and write field strength would suffer.

Unfortunately, the location of this flare point 510 is difficult to accurately locate at very small write head sizes. In order to overcome this limitation, the present invention include as secondary flare point that is defined by the front edges 506, 508 of the magnetic structures 502, 504. Therefore, these magnetic structures 502, 504 provide a secondary flare point and can be referred to as secondary flare structures 502, 504.

In addition, to the secondary flare structures 502, 504. Optional non-magnetic spacer layers 516, 518 can be formed at the sides of the secondary flare structures 502, 504. These non-magnetic spacer layers 516, 518 can be constructed of a material such as NiP that is both non-magnetic and capable of being deposited by electroplating. The non-magnetic layers 516, 518 each have a front edge that is self aligned with the front edge 506, 508 of each of the secondary flare structures 502, 504. The non-magnetic spacer layers 516, 518 can be useful for providing additional side gap spacing for the trailing, wrap around magnetic shield 322 described above in FIGS. 3 and 4.

Figure 6:
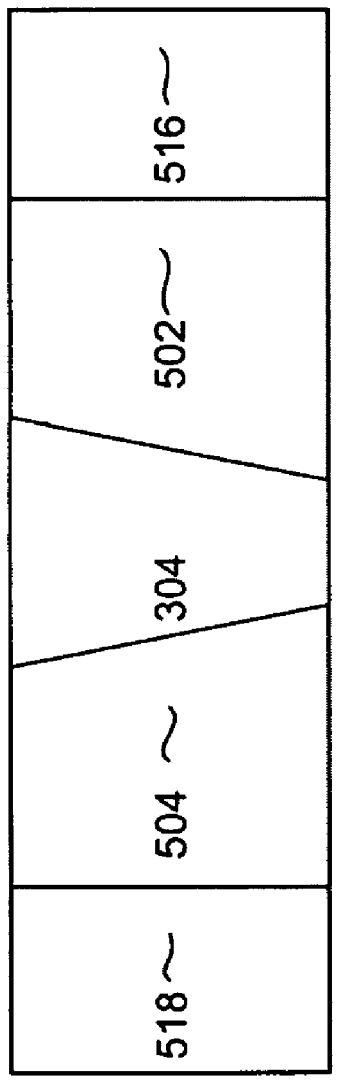
FIG. 6 is a view of the write pole of FIG. 5 taken from section line 6-6 of FIG. 5.

With reference now to FIG. 6, which shows a cross sectional view of the write pole 304 and secondary flare structures 502, 504, it can be seen that these secondary flare structures 502, 504 as well as the non-magnetic spacer layers 516, 518 only extend from the sides of the write pole 314 and do not extend over the trailing edge of the write pole 304. This structure greatly facilitates manufacturing as will be seen below. Furthermore, the location of the front edges 512, 508 can be very accurately controlled relative to the air bearing surface (ABS) as will be seen below.

Figure 7:
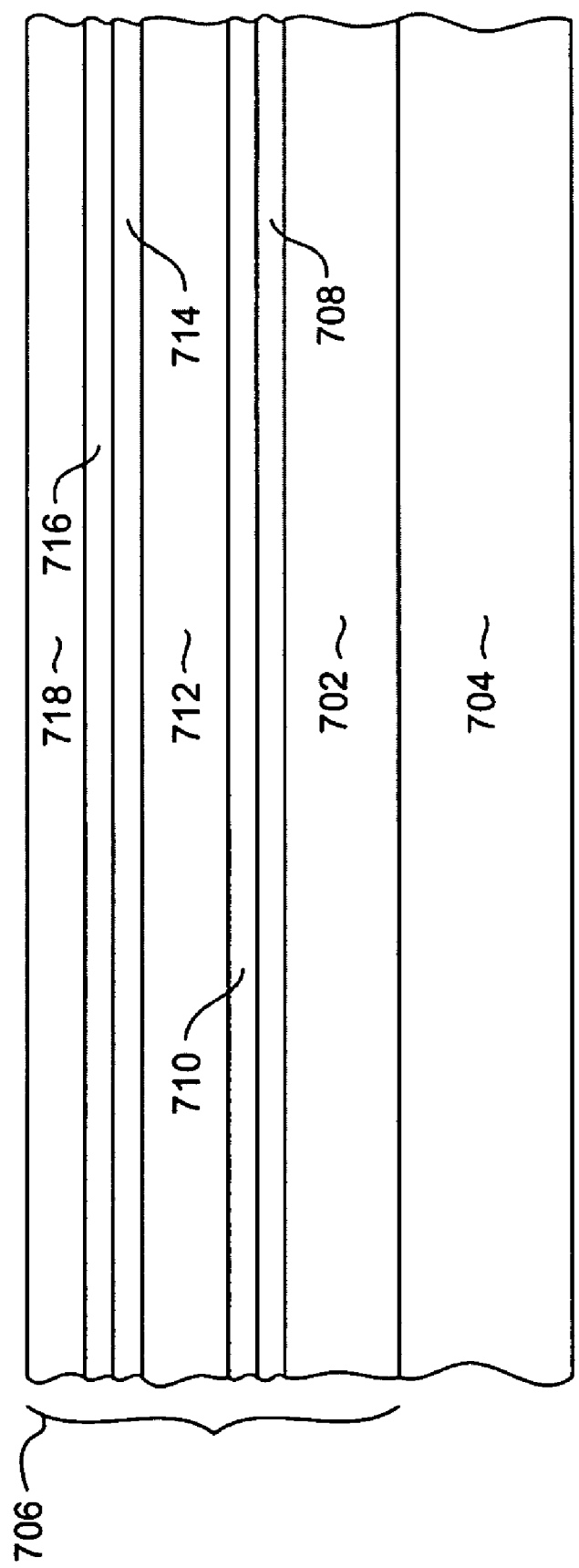
FIGS. 7-16 are illustrations of a write head in various intermediate stages of manufacture illustrating a method of manufacturing a magnetic write head according to an alternate embodiment of the invention.

With reference now to FIGS. 7-16 a method will be described for constructing a write head such as that described above. With particular reference to FIG. 7, a magnetic write pole material 702 is deposited over a substrate 704. The magnetic write pole material 702 is preferably a lamination of magnetic layers of a material such as CoFe separated by thin, non-magnetic layers.

A series of mask layers 706 is deposited over the write pole material 702. The series of mask layers 706 can include various layers and structures. By way of example, the series of mask layers 706 can include a first hard mask layer 708 that can be a material such as diamond like carbon (DLC) or alumina formed directly over the magnetic write pole material 702. A layer of AlTiOx 710 can optionally be deposited over the first hard mask layer. An image transfer layer 712 can also be provided, which can be a soluble polyimide material such a DURAMIDE®. Another hard mask layer 714, can be provided over the image transfer layer 712. This hard mask layer 714 can be, for example $SiO_2$. A Bottom Antireflective Coating (BARC) 716 can be provided over the upper hard mask layer 714. The BARC layer 716 can be a polyimide material such as DURAMIDE®. Finally, a photoresist layer 718 is deposited at the top of the mask layers 706.

Figure 8:
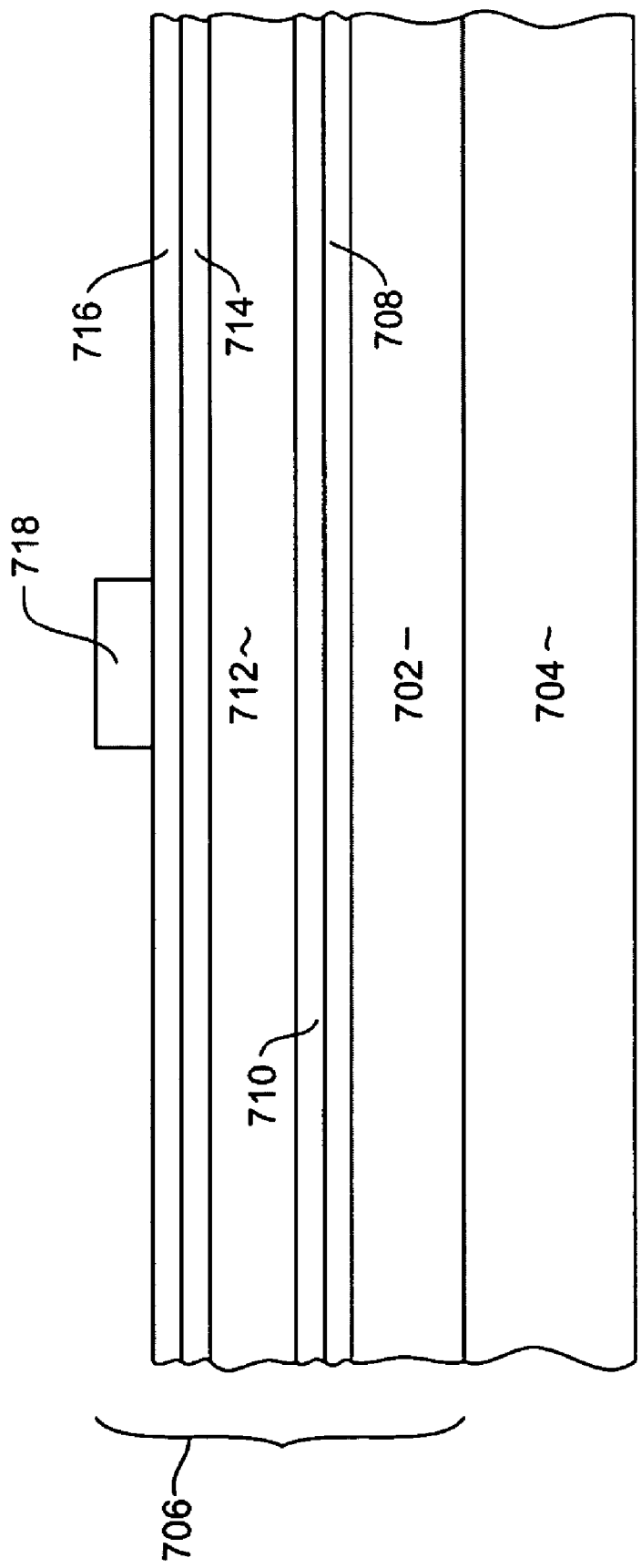
Figure 9:
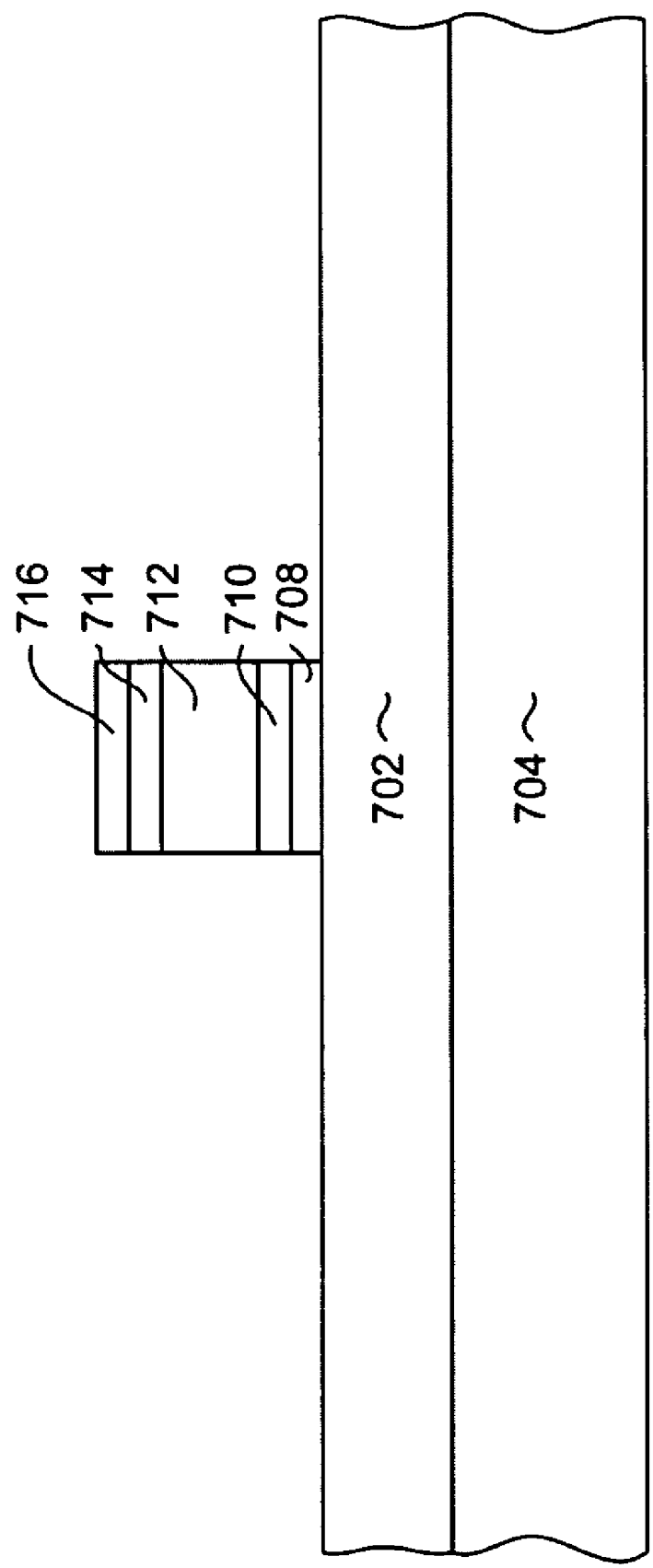

With reference to FIG. 8, the photoresist layer 718 is photolithographically patterned and developed to have a shape configured to define a write pole. Then, one or more material removal processes such as reactive ion etching and/or reactive ion milling are performed to transfer the image of the photoresist layer 718 onto the underlying mask layers 708-716. The photoresist layer 718 may be consumed during this process, resulting in a structure as shown in FIG. 9.

Figure 10:
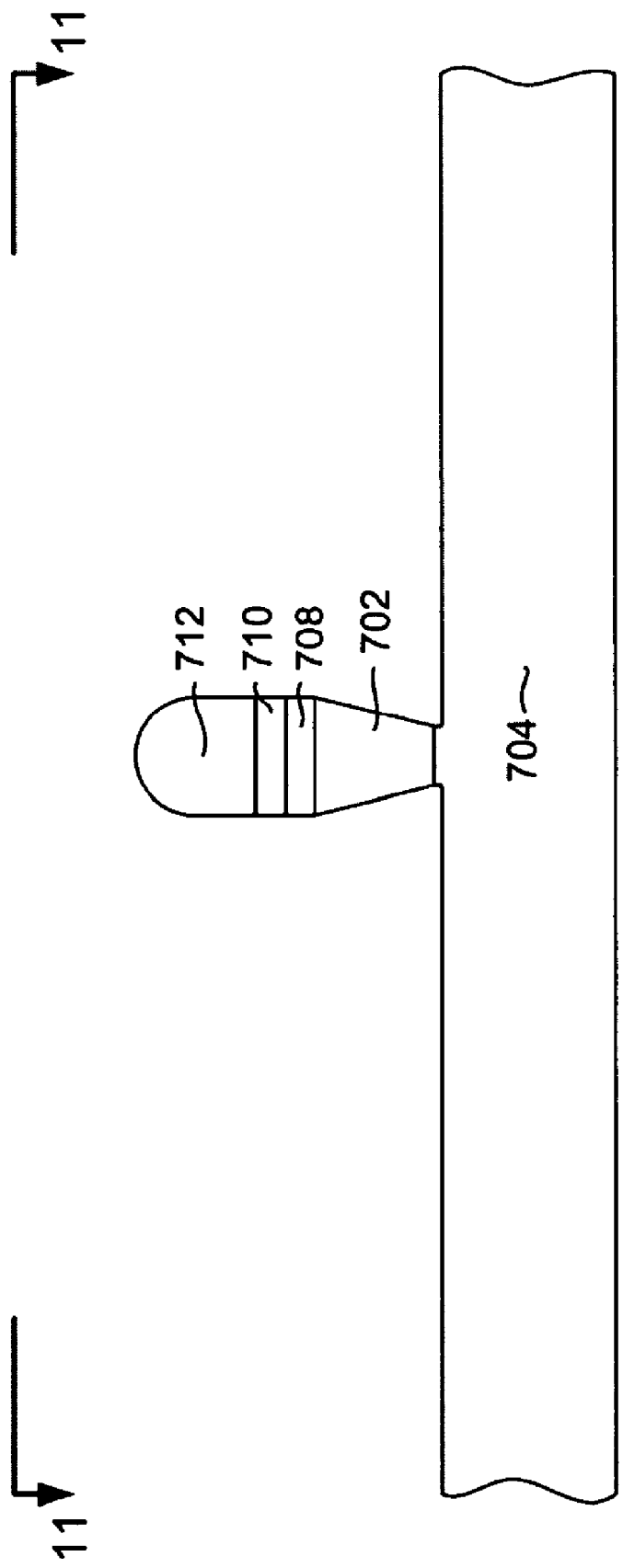

Then an ion milling is performed to remove portions of the write pole material 702 that are not protected by the mask layers 708-716. More of the mask layers, such as layers 714 and 716 may be consumed by the ion milling, leaving a structure as shown in FIG. 10. The ion milling is preferably performed at one or more angles relative to normal to form the write pole 702 with a trapezoidal shape as shown in FIG. 10.

Figure 11:
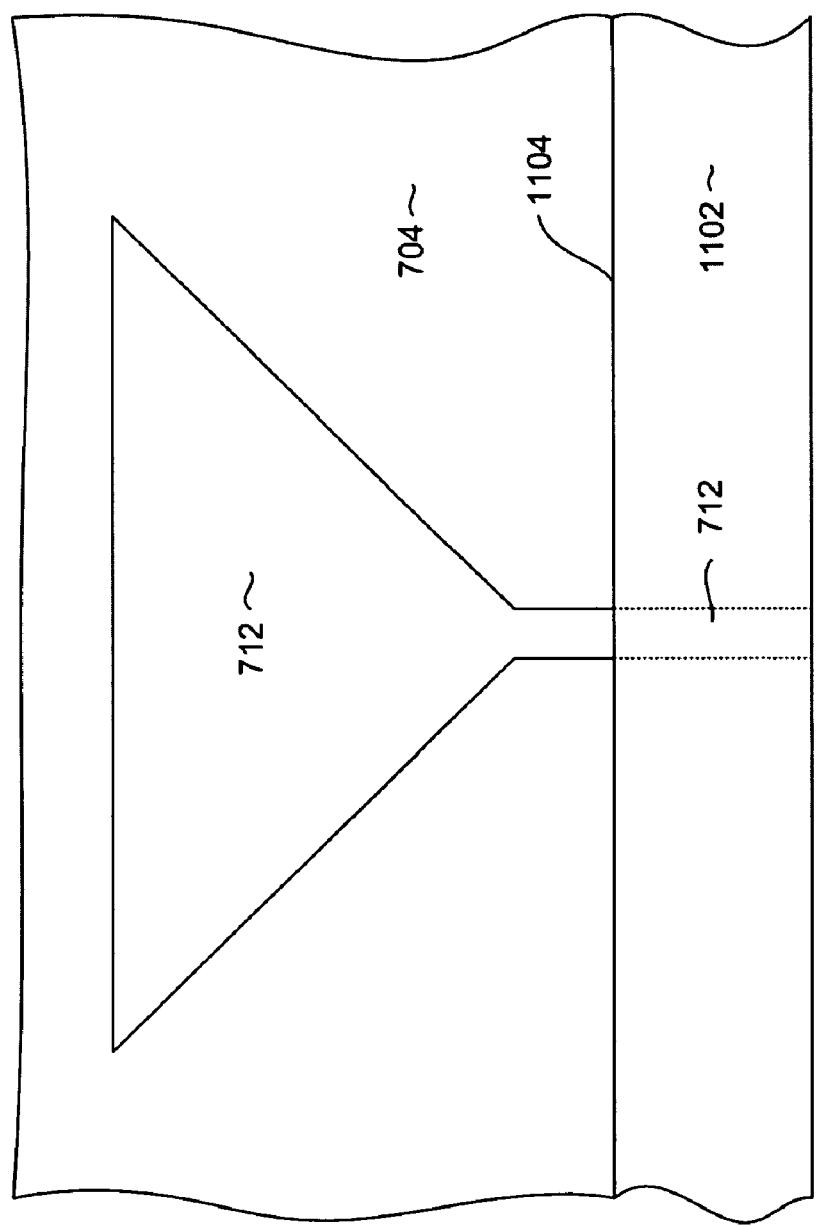
Figure 12:
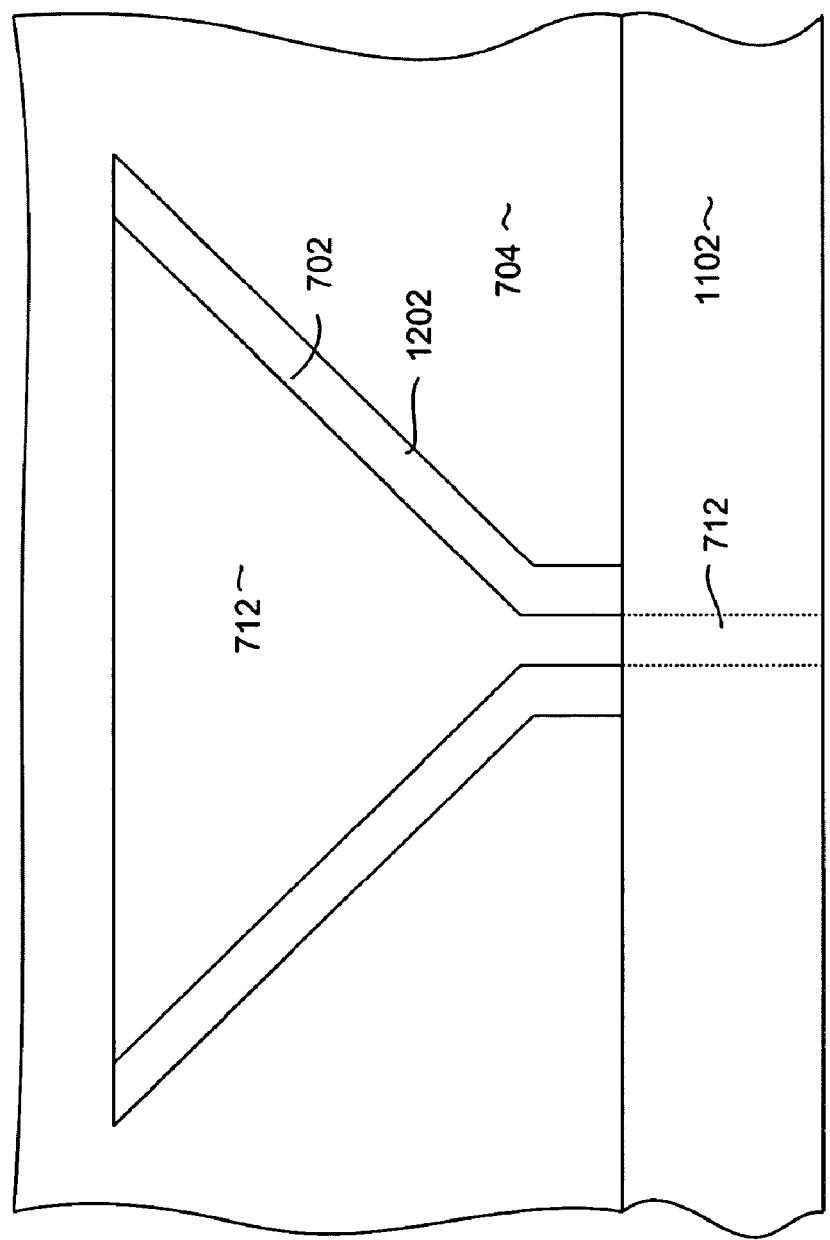

FIG. 11 shows a top down view as taken from line 11-11 of FIG. 10. As shown in FIG. 11, a photoresist mask structure 1102 is formed over a portion of the pole tip region of the write pole previously formed. It can also be seen that the remaining mask structure has been left intact so that the view shown in FIG. 11 looks down on the image transfer layer 712 portion of the mask structure remaining over the write pole 712 (FIG. 10). The mask 1102 has a back edge 1104 that is located to define a secondary flare point, as will become apparent below. Portions of the structure 712 and underlying structure hidden beneath the mask 1102 is shown in dotted line in FIG. 11

Figure 13:
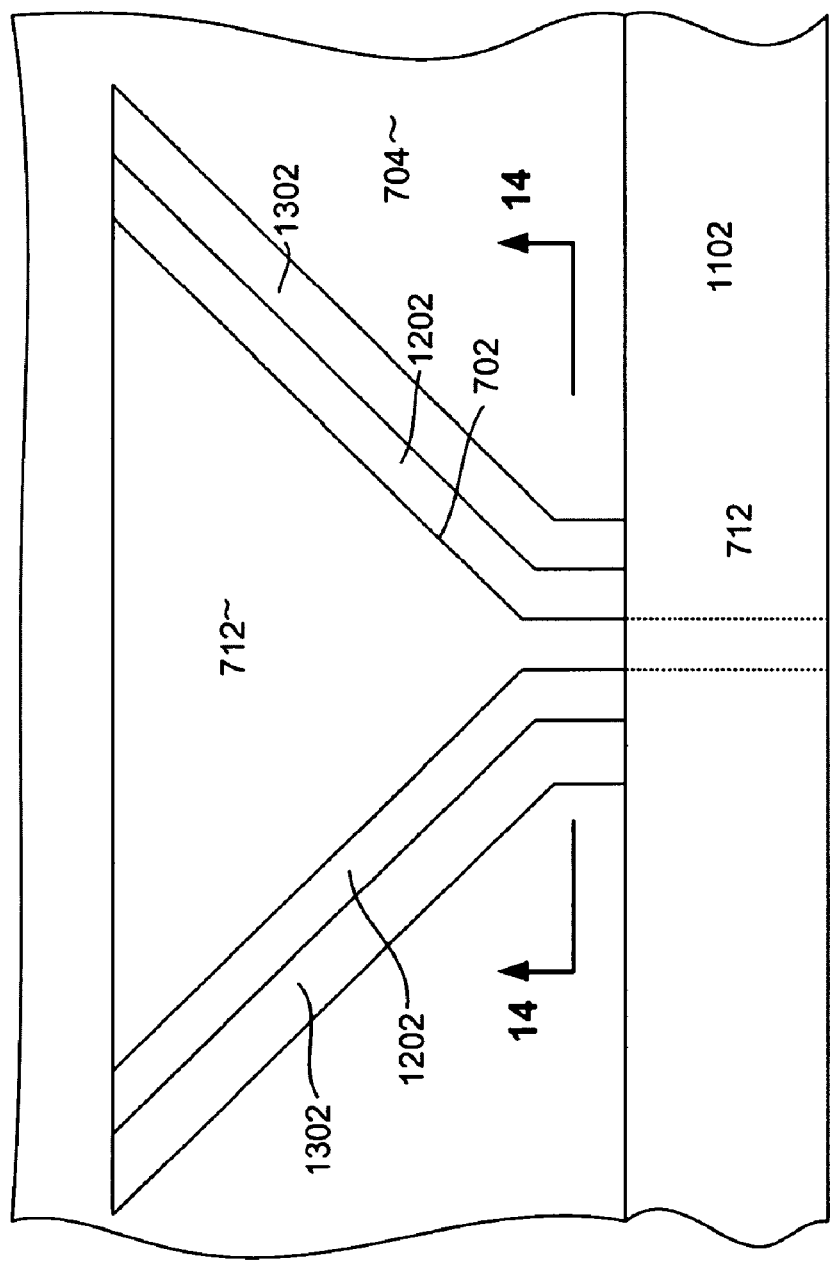
Figure 14:
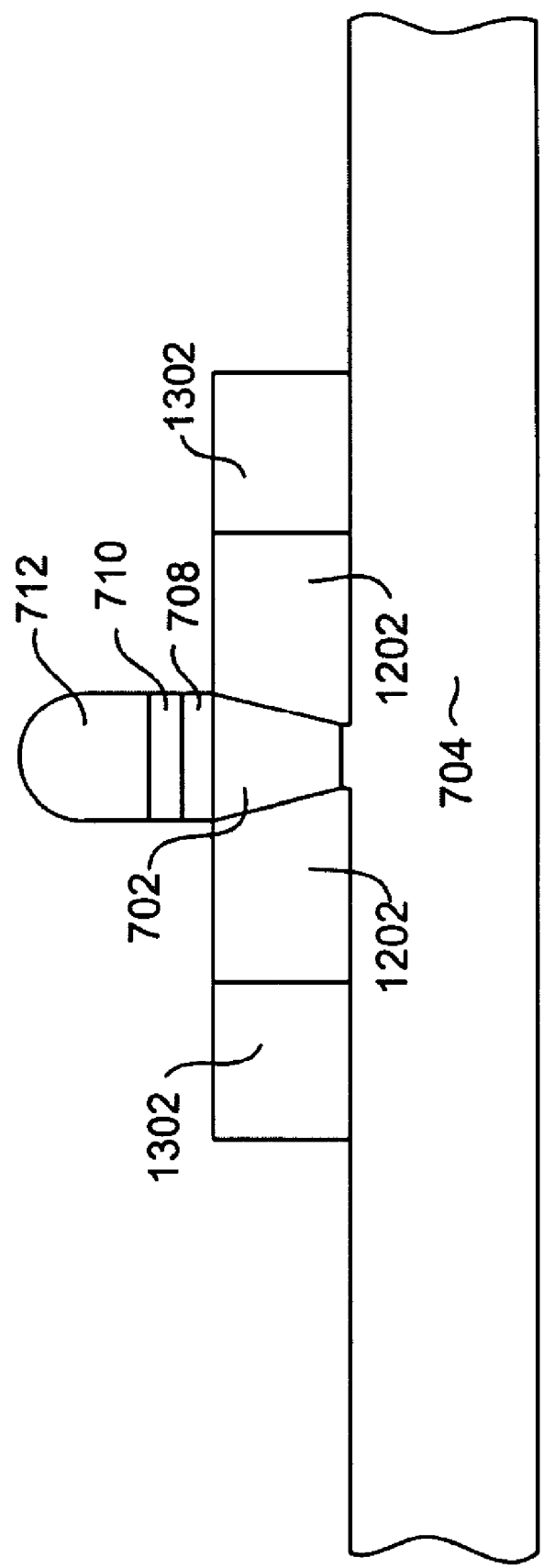

An etching process can be performed to ensure that not re-deposited material remains on the sides of the write pole. With the mask layers 708, 710, 712 still in place, a magnetic material 1202 is electroplated onto the sides of the write pole 702 (which is hidden beneath the mask layers 708, 710, 712 in FIG. 12. On optional non-magnetic material 1302 can then be plated onto the magnetic material 1202 as shown in FIG. 13. This non-magnetic material can be a material such a NiP and can be useful for providing additional non-magnetic side gap spacing for a trailing magnetic, trailing, wrap-around shield. FIG. 14 shows a cross sectional view as taken from the line 14-14 of FIG. 13. As can be seen in FIG. 13, the magnetic secondary flare structure 1302 and non-magnetic spacer layer extend laterally from the sides of the write pole 702, but the mask layers 708, 710, 712 remain over the top of the write pole 702.

The above method, then, provides a mechanism for constructing a well defined secondary flare structure 1202 without the need to first remove the mask layers 708, 710, 712. Since the processes used to remove the mask layers 708, 710, 712 can be aggressive and could cause damage to the underlying write pole 702, the above process, which defines the secondary flare structure without removing these layers 708, 710, 712 results in a higher quality write pole. In addition, the above method eliminates many processing steps, resulting in reduced throughput time and reduced manufacturing cost. After formation of the secondary flare structure, the mask layers 708, 710, 712 can be more easily removed.

Figure 15:
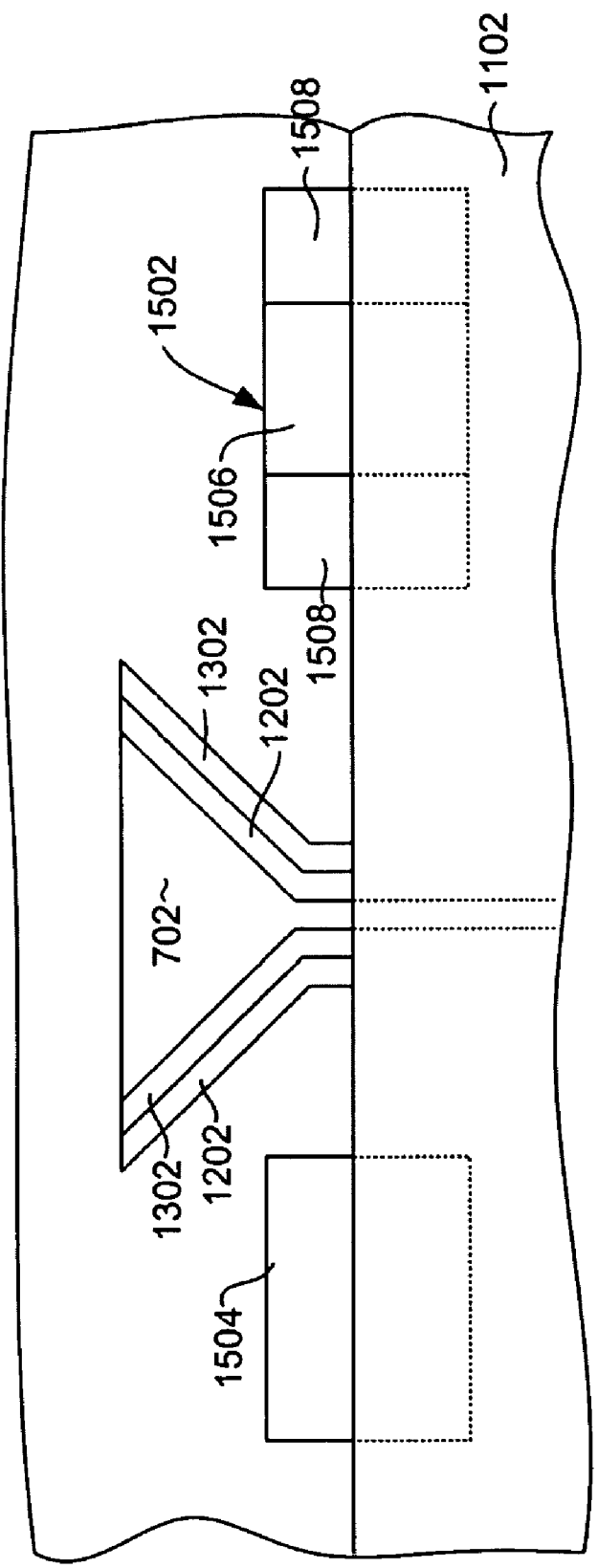

FIG. 15 is an expanded top down view shown with the mask structure 1102 still in place. In this view it can be seen that the mask 1102 can also be used to define a back edge (stripe height) of a read sensor 1502 and also the back edge of an electrical lapping guide. The read sensor can include a magnetoresistive sensor stack 1506 with magnetic hard bias layers 1508 formed at either side. The read sensor can be formed beside the write head and write pole 702 (rather than beneath it) and can be formed just beneath the build elevation of the write head.

With the mask still in place, an ion milling or other material removal process can be performed to remove portions of the read sensor 1502 and ELG 1504 that are not protected by the mask 1102, thereby forming a back edge 1602 of the read sensor and a back edge 1604 of the ELG 1504.

Figure 16:
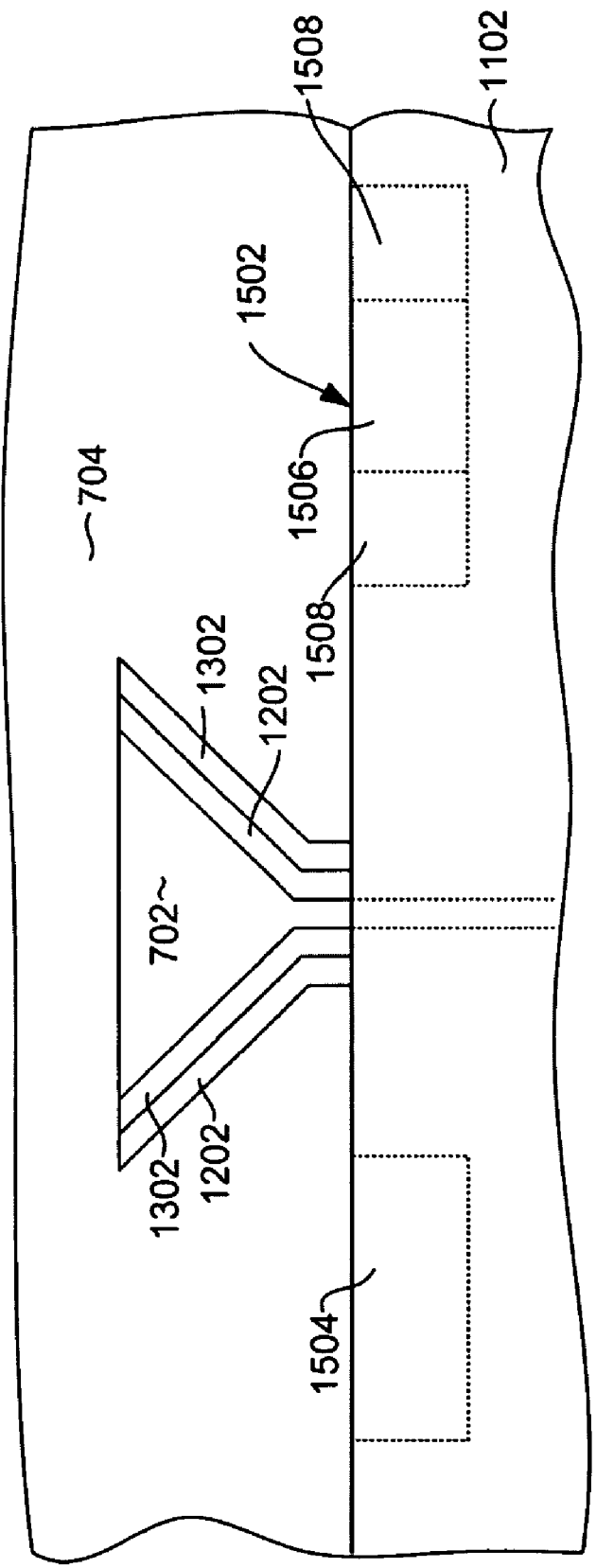

As those skilled in the art will appreciate, read and write heads are formed on a wafer with many thousands of such heads being formed on a single wafer. After the read and write heads have been fabricated, the wafer is cut into rows of sliders. Then, a lapping operation is performed on the row of sliders to remove material. As shown in FIG. 16, the lapping operation removes material from the direction indicated by arrow 1602. lapping is performed until a desired air bearing surface plane (ABS) is reached. The electrical lapping guide 1504 can be used to determine when lapping should be terminated. As material is removed from the front edge of the lapping guide 1504, the electrical resistance will increase. When the electrical resistance across the lapping guide reaches a predetermined level, the lapping is terminated. Since the back edge of the lapping guide 1504, back edge of the sensor 1502 and secondary flare point 1602 are all defined by the same mask structure 1102. The lapping guide can be used to accurately define the distance between the flare point 1602 and the ABS, as well as the back edge 1604 of the sensor 1502 relative to the air bearing surface (also referred to as the stripe height).

After forming the write pole 712, secondary flare structure 1202 and optional non-magnetic spacer layer 1302, the mask 1102 can be lifted off, and a magnetic shield (such as the magnetic shield 322 described in FIGS. 3 and 4) can be formed. The trailing wrap around shield 322 can be formed to extend over the secondary flare structure 1202 and non-magnetic spacer 1302. Construction of the shield 322 can include forming a non-magnetic side gap and trailing gap, forming a photoresist frame and electroplating a magnetic material into the photoresist frame, which steps are not shown here as this is not a focus of the present invention.

While various embodiments have been described, it should be understood that they have been presented by way of example only, and not limitation. Other embodiments falling within the scope of the invention may also become apparent to those skilled in the art. Thus, the breadth and scope of the invention should not be limited by any of the above-described exemplary embodiments, but should be defined only in accordance with the following claims and their equivalents.

What is claimed is:

1. A magnetic write head for perpendicular magnetic recording, comprising:

A magnetic write pole, the magnetic write pole having first and second sides and a trailing edge surface that extends from the first side to the second side, and having a pole tip portion that extends to an air bearing surface and a flared portion removed from the air bearing surface, the flared portion and the pole tip portion meeting at a junction that defines a flare point;

first and second magnetic structures extending from the first and second sides of the write pole, the magnetic structures each having a front edge that defines a secondary flare point located between the flare point and the air bearing surface, the first and second magnetic structure being formed so as not to contact the trailing edge surface of the write pole; and first and second non-magnetic spacer layers contacting the first and second magnetic structures, each of the non-magnetic spacer layers having a front edge that is aligned with the front edge of the magnetic structures.

2. A magnetic write head as in claim 1 wherein the first and second magnetic structures are electroplated features.

3. A magnetic write head as in claim 1 wherein the first and second magnetic structures comprise a NiFe, or CoFe alloy.

4. A magnetic write head as in claim 1, wherein the first and second non-magnetic spacer layers each comprise an electrically conductive material.

5. A magnetic write head as in claim 1, wherein the first and second non-magnetic spacer layers each comprise a material that can be deposited by electroplating.

6. A magnetic write head as in claim 1 further comprising a trailing, wrap-around magnetic shield formed over a portion of the write pole, the trailing, wrap-around magnetic shield extending from the air bearing surface to a point beyond the secondary stripe height defined by the front edge of the first and second magnetic structures.

7. A magnetic write head as in claim 1 further comprising:

a trailing, wrap-around magnetic shield formed over a portion of the write pole, the trailing, wrap-around magnetic shield extending from the air bearing surface to a point beyond the secondary stripe height defined by the front edge of the first and second magnetic structures, the trailing, wrap-around magnetic shield having first and second side shield portions that wrap around the write pole, and further comprising first and second non-magnetic side gap layers separating the write pole from the side portions of the wrap-around, trailing magnetic shield, the non-magnetic side gap layers also extending over outer sides of the non-magnetic spacer layers, the combined thickness of the first and second non-magnetic spacer layers and the non-magnetic side gap layers providing an extra non-magnetic side gap spacing in a region beyond the secondary flare point.

8. A magnetic write head as in claim 7 further comprising a non-magnetic trailing gap layer separating the wrap-around, trailing magnetic shield from the trailing edge of the write pole.

9. A magnetic data storage system, comprising:

a housing;

a magnetic disk rotatably mounted within the housing;

an actuator mounted within the housing;

a slider connected with the actuator for movement adjacent to a surface of the magnetic medium; and a magnetic write head formed on the slider, the magnetic write head further comprising:

a magnetic write pole, the magnetic write pole having first and second sides and a trailing edge surface that extends from the first side to the second side, and having a pole tip portion that extends to an air bearing surface and a flared portion removed from the air bearing surface, the flared portion and the pole tip portion meeting at a junction that defines a flare point; and first and second magnetic structures extending from the first and second sides of the write pole, the magnetic structures each having a front edge that defines a secondary flare point located between the flare point and the air bearing surface, the first and second magnetic structure being formed so as not to contact the trailing edge surface of the write pole; and first and second non-magnetic spacer layers contacting the first and second magnetic structures, each of the non-magnetic spacer layers having a front edge that is aligned with the front edge of the magnetic structures.

10. A magnetic data storage system as in claim 9 wherein the first and second magnetic structures are electroplated features.

11. A magnetic data storage system as in claim 9 wherein the first and second magnetic structures comprise a NiFe, or CoFe alloy.

* * * * *